No. 758,209. PATENTED APR. 26, 1904.
A. HENDEY.
TIRE.
APPLICATION FILED NOV. 28, 1903.
NO MODEL.
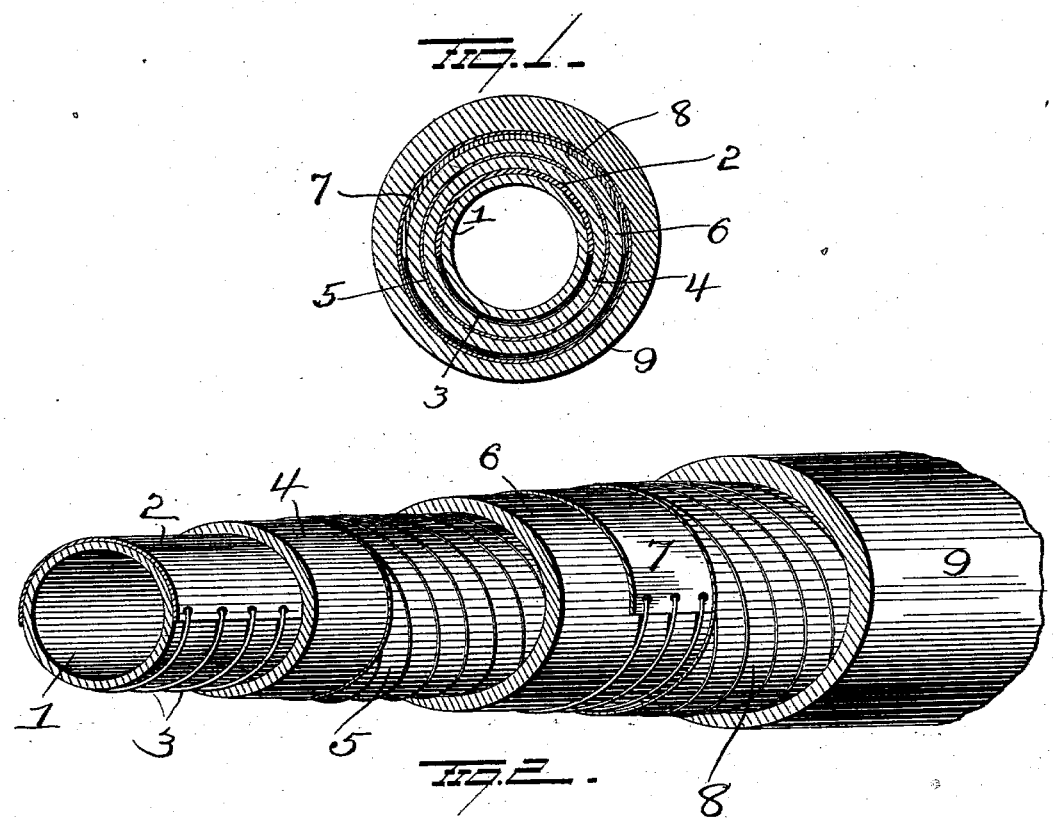
WITNESSES
E. J. Nottingham
G. F. Downing
INVENTOR
Arthur Hendey
By H. A. Seymour
Attorney

UNITED STATES PATENT OFFICE.

ARTHUR HENDEY, OF JEROME, ARIZONA TERRITORY.

TIRE.

SPECIFICATION forming part of Letters Patent No. 758,209, dated April 26, 1904.

Application filed November 28, 1903. Serial No. 183,035. (No model.)

*To all whom it may concern:*

Be it known that I, ARTHUR HENDEY, a resident of Jerome, in the county of Yavapai and Territory of Arizona, have invented certain new and useful Improvements in Tires; and I do hereby declare the following to be a full, clear, and exact description of the invention, such as will enable others skilled in the art to which it appertains to make and use the same.

My invention relates to an improvement in tires, and more particularly to pneumatic tires, the object of the invention being to provide a tire which will be practically punctureproof and one which will be sufficiently strong to prevent bursting due to pressure from within and strain of weight thereon and which will have sufficient strength of formation to maintain itself on the wheel-rim under all conditions.

With this object in view the invention consists in certain novel features of construction and combinations and arrangements of parts, as will be more fully hereinafter described, and pointed out in the claims.

In the accompanying drawings, Figure 1 is a view in cross-section, and Fig. 2 is a view in elevation, showing the separate layers of material broken away to illustrate the formation of the tire.

1 represents a rubber tube to receive the compressed air to inflate the tire. Over the tread of this tube 1 is located a strip 2 of rawhide, which has been previously moistened and shrunk onto a former of the same size as tube 1 to give to the rawhide strip its greatest strength, making it of such resistance as to be almost, if not quite, impossible to penetrate the same when backed by the yielding cushion of tube 1.

The strip 2 is preferably of a width to pass at least halfway around the tube 1 and is perforated along its longitudinal edges to receive a lacing 3 around the inner portion of tube 1 and securely bind the strip thereon, and the ends of said strip are perforated to receive a similar lacing to secure them together, or the ends may be overlapped and cemented or otherwise secured together. A coating or layer 4 of rubber is then formed around and inclosing strip 2 and tube 1, and around this rubber covering 4 a strip 5 of rawhide is spirally wound, with its edges preferably overlapping and the ends secured in any approved manner. Another coating or layer 6 of rubber is then formed around and inclosing the wound strip 5, and a rawhide protective strip 7 is located around the tread of the tube thus formed and securely laced in position like strip 2, above explained. A strip or tape 8 of rawhide is then spirally wound around the tube, and an outer rubber covering 9 is formed thereon to complete the tire.

While I prefer rawhide strips in the manufacture of the tire, I might employ metal protective strips and winding of sufficient thinness and elasticity not to interfere with the elasticity of the tire, and other material might be employed. I might also dispense with some of the coatings or coverings and construct the tire of fewer elements than described and might differently arrange the several elements without departing from my invention.

With my improvements a tire is produced which will be practically puncture-proof and sufficiently strong to withstand all strains thereon, at the same time being sufficiently elastic so as not to interfere with the ordinary functions of a pneumatic tire.

A great many changes might be made in the general form and arrangement of the parts described without departing from my invention, and hence I do not wish to restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a tire, the combination with a flexible tube to be inflated, of a protective strip around the tread of said tube, lacing securing the strip thereon, a rubber coating around the strip and tube and inclosing the strip and inner tube.

2. In a tire, the combination with a flexible tube, to be inflated, of a rawhide strip wound spirally around the tube, and a rubber covering inclosing the latter.

3. In a tire, the combination with a flexible tube to be inflated, of a protective strip around the tread of said tube, a coating of rubber inclosing the strip and inner tube, a strip wound spirally around said coating and an outer covering thereon.

4. In a tire, the combination with a flexible tube to be inflated, of a protective strip around the tread of said tube, lacing securing the strip thereon, a rubber coating around the strip and tube, a strip wound spirally around said coating, and a covering of rubber over said winding.

5. In a tire, the combination with a flexible tube to be inflated, of a protective strip around the tread of said tube, a coating of rubber over the strip and tube, a strip wound spirally around said coating, another rubber coating inclosing the winding, a protective strip around the tread of said last-mentioned coating, a strip spirally wound around the protective strip, and an outer rubber covering inclosing the winding.

In testimony whereof I have signed this specification in the presence of two subscribing witnesses.

ARTHUR HENDEY.

Witnesses:
   GEO. W. AVERY,
   ELEANORA MILLER.